United States Patent [19]

Kamman

[11] Patent Number: 4,664,536
[45] Date of Patent: May 12, 1987

[54] COMPOUND DAMPER SYSTEM
[75] Inventor: Joseph T. Kamman, Cincinnati, Ohio
[73] Assignee: Cincinnati Milacron Inc., Cincinnati, Ohio
[21] Appl. No.: 801,668
[22] Filed: Nov. 25, 1985
[51] Int. Cl.[4] .............................................. F16C 19/04
[52] U.S. Cl. ...................................................... 384/99
[58] Field of Search ............... 308/3 R, 5 R, 3.5, 3 A; 384/99, 536, 535, 582, 581

[56] References Cited
U.S. PATENT DOCUMENTS

| | | |
|---|---|---|
| 3,456,992 | 7/1969 | Kulina . |
| 3,540,346 | 11/1970 | Jones ......................................... 90/11 |
| 3,747,470 | 7/1973 | Inoue et al. .............................. 90/11 |
| 3,836,215 | 9/1974 | Dopkin . |
| 3,844,630 | 10/1974 | Lechner ................................. 384/99 |
| 3,897,985 | 8/1975 | Davis et al. . |
| 3,980,358 | 9/1976 | Davis . |
| 4,084,861 | 4/1978 | Greenberg et al. . |
| 4,453,783 | 6/1984 | Davis et al. ........................... 384/99 |
| 4,604,008 | 8/1986 | Bone ..................................... 409/231 |

Primary Examiner—Lenard A. Footland
Attorney, Agent, or Firm—Thomas M. Farrell

[57] ABSTRACT

An extensible boring bar is moved between fully retracted and fully extended positions proximal and distal to a machine housing. The bar is supported at a point within the housing and a snout and damper assembly is provided at the outermost face of the housing. The snout and damper assembly forms a compound damper system whereby an annular ring around an outer quill serves to damp the bar when simply supported in its fully retracted position, by damping the end support bearing directly. In the fully extended position, the bar is generally-cantilevered beyond the snout and damper assembly, and deflection of the bar will occur between the interior, support point and the snout support. Thus, the snout carries an additional annular damping chamber around the bar between the annular damping ring and interior or support point to damp the intermediate crown or deflection of the bar when fully-extended.

1 Claim, 5 Drawing Figures

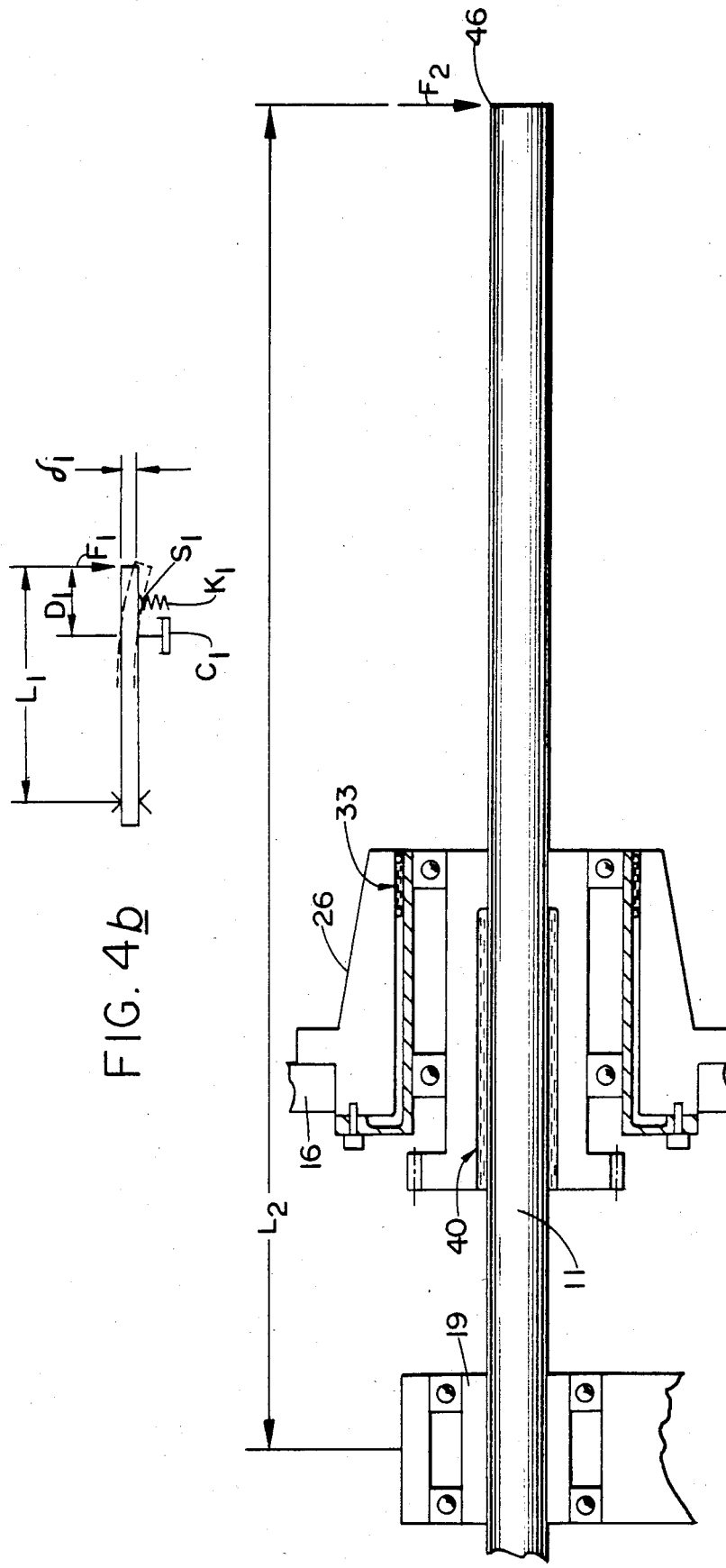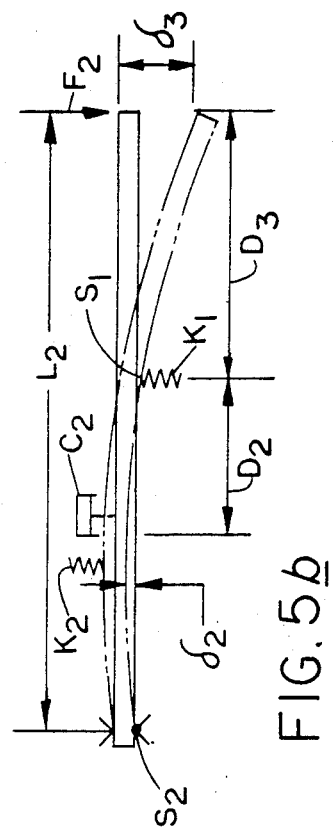

COMPOUND DAMPER SYSTEM

BACKGROUND OF THE INVENTION

The invention relates generally to damping of machine spindles and the like and, specifically, the invention relates to machines and other equipment having a relatively long working bar extending from the main machine body, where the bar is subjected to vibrational movements.

Machines such as horizontal boring machines and other similar machine tools are typically constructed so that a machine spindle or boring bar may slide relative to the machine base so that the tool tip at the outermost bar end is moved from a working position proximal to the machine base, to a fully-extended position distal to the machine base.

The extensible boring bar is effectively supported in two different manners at its extreme adjusting positions. When proximal the machine spindle base, the spindle behaves in a relatively simply supported manner, and is loaded at or near the first support, i.e. the snout of the machine. When fully-extended, the machine bar is basically cantilevered beyond the same two support points, and an intermediate deflection seen at the spindle is between the two support points. In the fully-retracted or simply supported, position, the maximum deflection seen by the spindle is at the snout, or end support. While no prior art patents attempt to solve the problem of vibrations occurring on such an extensible bar, several patents are generally noteworthy in the hydraulic damper art, as follows:

U.S. Pat. No. 3,747,470 —Inoue et al: attempts to place a vibration damper at or near the loading point of a spindle, i.e. between the spindle bearing and the loading point of a spindle, whereas prior art devices attempt to place the support bearing up close to the loading point for high static stiffness. The device further teaches a viscous fluid film device with controlled fluid flow through the device. Inoue does not teach a mechanism whereby an extensible bar is moved between a relatively simply supported state to a two-support cantilever-load supported condition.

U.S. Pat. No. 3,836,215—Dopkins: teaches a single damper ring, wherein the damper ring contains a shaft bearing but the particular bearing does not support any load. The damper ring device features a bleed conduit so that viscous fluid may flow through the device. The bearing/damper ring is placed between a pair of load supporting bearings which effectively carry a shaft in a simply-supported manner. It is assumed, but not shown, in Dopkins tha the load is an overhung load and that the maximum deflection of the shaft would be between the load supporting bearings.

U.S. Pat. No. 3,897,985—Davis et al: teaches a squeeze films shaft damper, having an annular ring around a shaft end bearing which is filled with fluid and sealed with O-rings. The Davis patent does not teach how or where the load is applied to the shaft.

U.S. Pat. No. 3,980,358—Davis: a vertical assembly (FIGS. 1, 2 and 3) is depicted with an annular squeeze film damper around the bottom shaft and bearing. The device also features an axial damper flange on the radial end bearing damper.

U.S. Pat. No. 4,084,861—Greenberg: teaches a cantilevered bearing support with an annular damping ring around the spindle end bearing, which is designed to bottom out against a damper support which, in turn is likewise cantilever-mounted with a predetermined spring rate. The Greenberg patent does not teach the use of any other bearings to support the shaft, nor does it relate the device to a specific shaft loading point.

U.S. Pat. No. 3,456,992—Kulina: teaches a radial damper ring around a shaft bearing, wherein the ring is cantilever-mounted to a base, and the device has a controlled orifice leakage for a viscous damping fluid.

With regard to the types of machines to which the instant invention may be applied, U.S. Pat. No. 3,540,346—Jones, discloses a typical, undamped, horizontal boring machine with a hydraulically-actuated clamping sleeve for the boring bar.

Applicant has addressed the problem of damping the extensible boring bar and has solved it in a unique manner with a compound squeeze film damping device.

It is therefore an object of the present invention to effectively damp vibrations in a boring bar and other like bar-type machines wherein the boring bar is extensible between positions proximal to a machine base and distal to the machine base.

SUMMARY OF THE INVENTION

The invention is shown embodied in a compound damper system for an extensible tool bar, comprising a housing such as machine spindle housing; a first bearing located in the housing at the outer face; a second bearing axially-spaced from the first bearing towards the interior of the housing; a tool bar rotatably-carried in the bearings at all times and axially extensible from a first effective length L1 where the outermost loading bearing end is proximally said first bearing, to a second effective length L2 where the outermost load bearing end of the bar is distally outside the first bearing; a first radial damper unit in contact with said first bearing; and a second radial damper unit in contact with said tool bar at a point approximately midway between the first and second bearings, whereby radial vibrations of the tool bar at a point proximately outside the first bearing will be attenuated principally by the first damper unit at the first load supporting bearing, and whereby radial vibration of the tool bar at a point distally outside the first bearing will be attenuated principally by the second damper unit located between the first and second bearings.

BRIEF DESCRIPTION OF THE DRAWINGS

FIGS. 4a and 4b are diagrammatic views through the boring bar unit and damper assembly of FIG. 2, with the bar in the fully retracted position.

FIGS. 5a and 5b are diagrammatic views through the boring bar and damper unit of FIG. 2 illustrating the bar in the fully advanced condition.

DESCRIPTION OF THE PREFERRED EMBODIMENT

Figure 1:
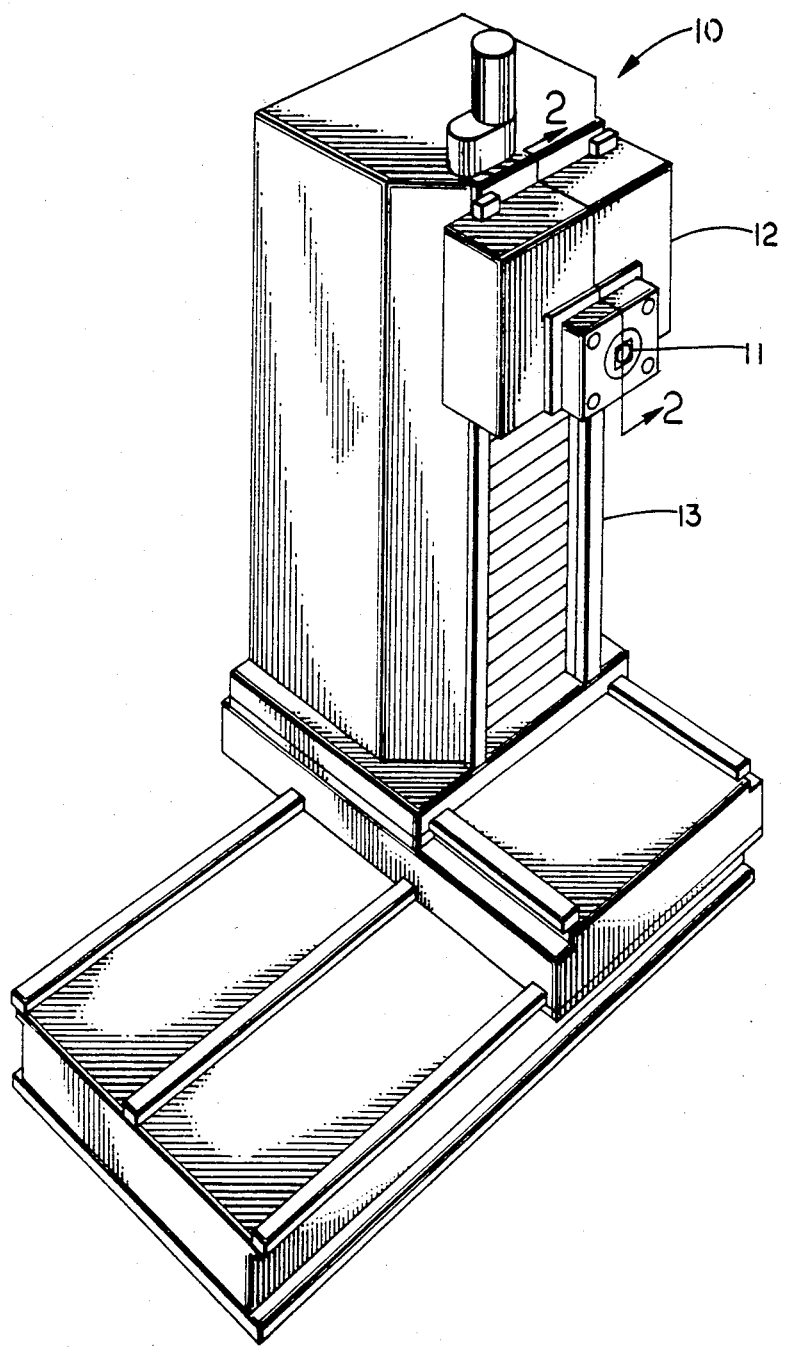
FIG. 1 of the drawings is a front perspective view of a machine employing a horizontal boring bar unit.
Figure 2:
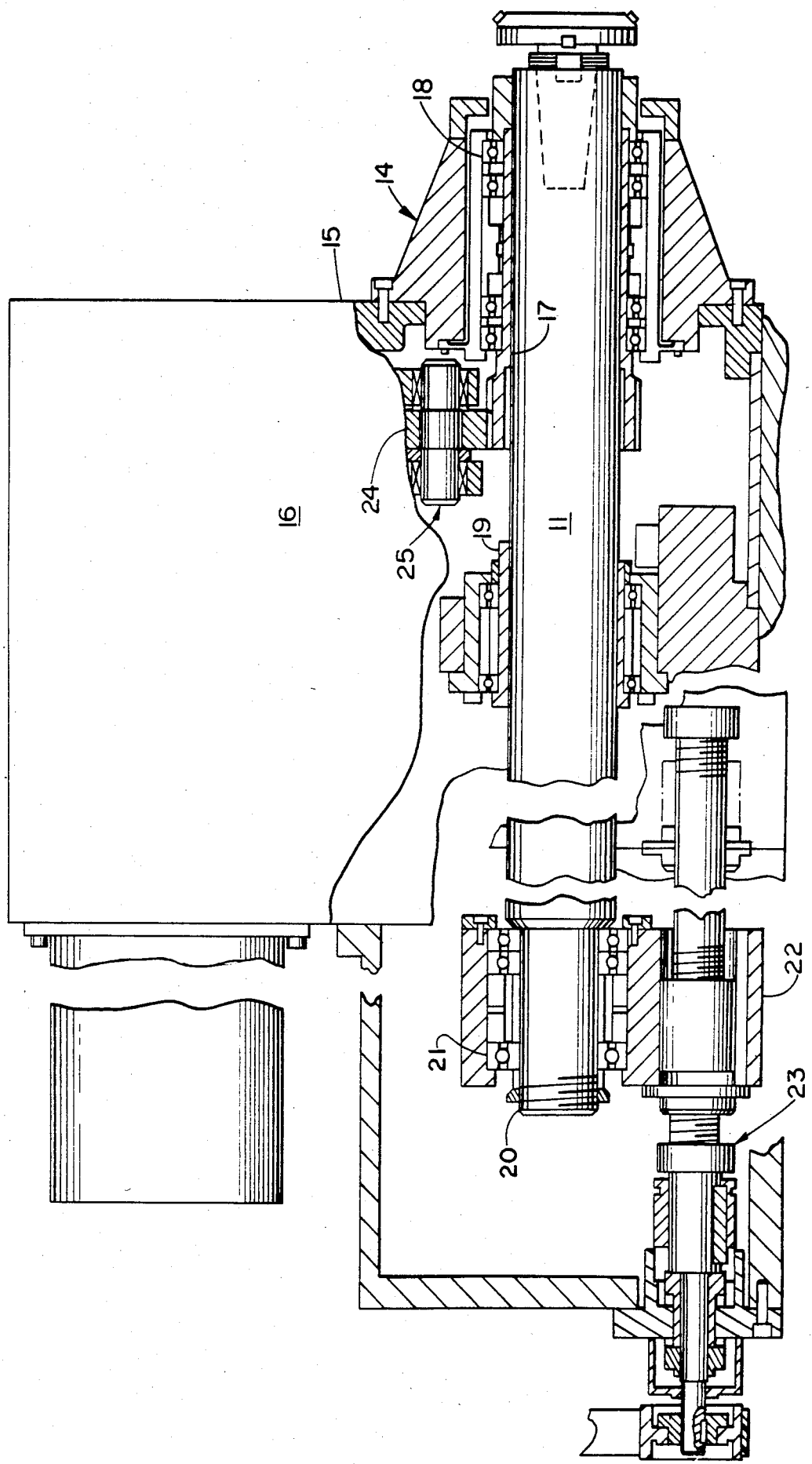
FIG. 2 is a side elevational section through the spindle carrier unit of FIG. 1.

FIG. 1 of the drawings illustrates an exemplary horizontal boring machine 10 having a boring bar 11 which is carried in a spindle carrier 12 on vertical ways 13. The sectional view, FIG. 2, illustrates that the boring bar 11 is carried in a snout support and damper assembly 14 at the outermost face 15 of the spindle carrier housing 16. The bar 11 extends inwardly through a support quill 17 carried in a set of rotary bearings 18 and continues through an intermediate support tube 19, on to an end portion 20 which is rotatably supported in end bearings 21. The end bearings 21 are, in turn, carried in an end block 22 propelled axially by a ball screw and nut unit 23. Therefore, the bar 11 may rotate while being advanced and retracted by the ball screw and nut unit 23. The torque couple to the boring bar 11 is typically attached near the forward end of the bar 11 at the final gear 24 in a drive transmission 25. In prior art assemblies, the torque couple comprises a key and keyway, wherein the keyway runs the length of the bar and therefore extends out into space when the bar is fully extended. In the preferred embodiment depicted in FIG. 2, the boring bar 11 has a noncircular cross section, so that torque may be transmitted from the final gear 24 to the bar 11 without the need for keys and keyways. Here it should be noted that the intermediate support tube 19 is also rotatably journalled because of the noncircular cross-section. In a circular bar system, the intermediate support tube 19 need not be rotatably carried, but may simply comprise a plain bushing to provide radial support.

Figure 3:
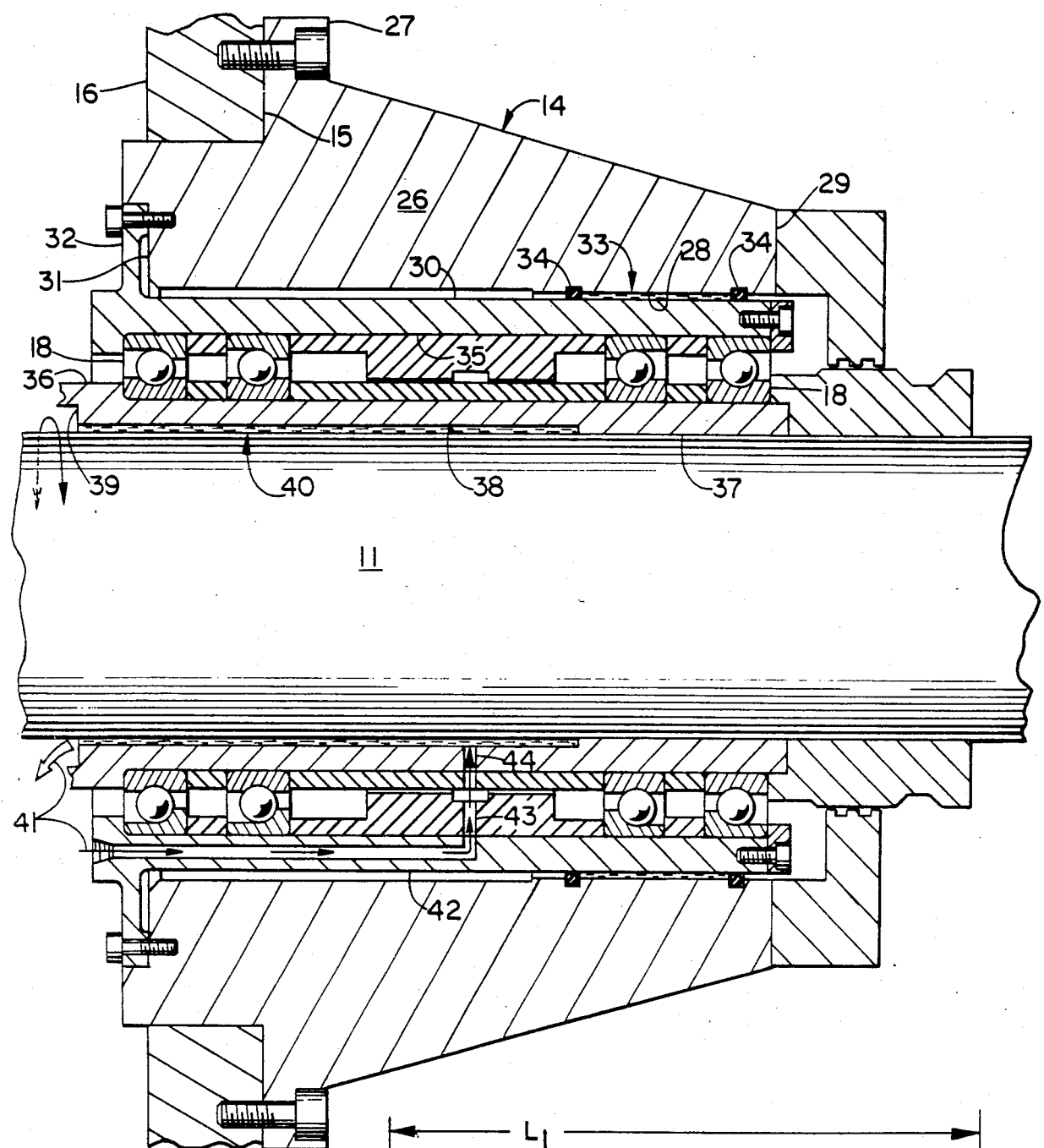
FIG. 3 is an enlarged side elevational section through the damper assembly of FIG. 2.

The closeup sectional view of FIG. 3 illustrates the snout support and damper assembly 14, wherein the snout 26 is a conical casting having a flange 27 bolted the front face 15 of the spindle carrier housing 16. The snout 26 is bored throughout and has a precision bore 28 near its outermost face 29. An outer quill 30 is located in the precision bore 28 and extends inwardly to the inner counterbored face 31 of the snout 26 where an integral diaphragm flange portion 32 on the outer quill 30 is bolted to the snout 26. A thin, squeeze-film, annular damping chamber 33 is formed between the quill 30 and the precision bore 28 of the snout 26. The chamber 33 is sealed with O-rings 34 at both ends and filled with a viscous damping medium. In this supported manner the quill 30 may deflect and rock in a cantilever fashion about the diaphragm flange portion 32.

The outer quill 30 has an inner bore 35 which has front and rear sets of angular contact ball bearings 18 which, in turn, serve to support an inner quill 36. The inner quill 36 is a generally cylindrical unit restrained from axial movement with respect to the bearing sets and the outer quill 30. The inner quill 36 has a bore 37 (in this case noncircular) adapted to slidably support the extensible bar 11. A relief portion 38 is machined along the bore 37 of the inner quill 36, extending axially from the first annular damping chamber 33 to the innermost face 39 of the inner quill 36. The relief portion 38 forms a second generally annular, thin squeeze-film damping chamber 40 which is open at the innermost quill face 39, and viscous fluid may be ported through the damping chamber 40 by means of interdrilled holes 42,43,44.

The antifriction bearings 18, etc. are of such high static stiffness so as to be treated as rigid when compared to the two squeeze-film damping chambers 33,40.

Figure 4A:
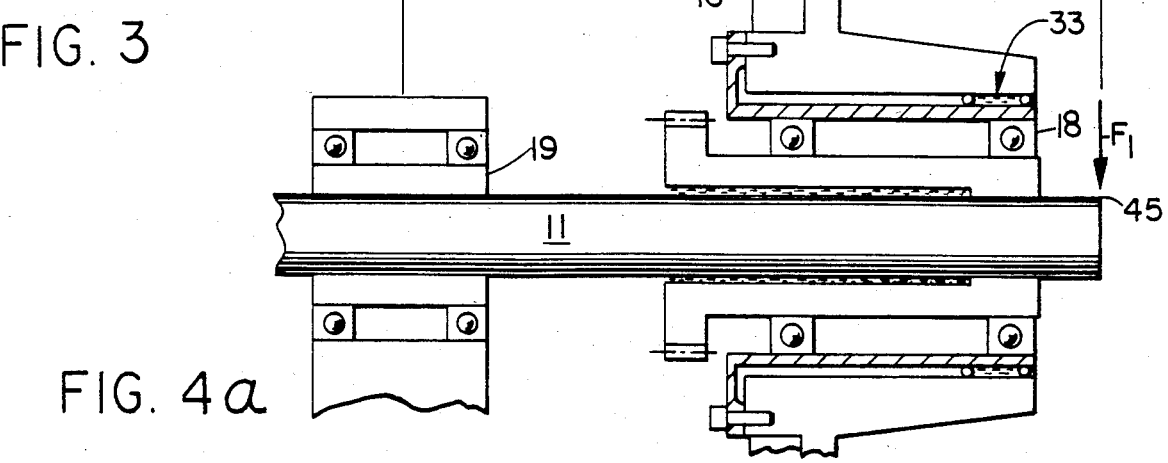

Referring to the diagrammatic views of FIGS. 4a and 4b, the boring bar 11 is shown fully retracted, and is loaded with a force $F_1$ at a point 45 proximal the first set of bearings i.e., where the bar 11 is deflectable against the first annular damping chamber 33. An effective length $L_1$ is created from the intermediate support tube 19, located within the spindle carrier housing 16, to the outermost bar end or loading point 45, and the effective bar length $L_1$ may be considered simply-supported.

FIG. 4b illustrates that the maximum deflection delta 1 is expected at the load point 45 due to the relatively low static stiffness at the snout support point $S_1$. While the damping chamber 33 is actually a short distance $D_1$ from the end of the bar 11, $D_1$ is negligible when compared to effective bar length, $L_1$. The snout support point $S_1$ has a damping coefficient $C_1$ and spring constant $K_1$ effected by the annular damping chamber 33. FIG. 5a illustrates the boring bar 11 in a fully extended condition, whereby an effective length L2 is realized from the intermediate support tube 19 to the outermost point 46 where force $F_2$ is applied.

In the preferred embodiment, the overhang $D_3$ from the snout 26 may be in the range of three feet, whereby the intermediate support tube 19 may be located approximately 2 to 3 feet to the interior of the spindle carrier housing 16. In the diagrammatic drawing of FIG. 5b, the bar 11, cantilevered an amount $D_3$, and deflected at the end point 46 to dimension delta 3 will cause a deflection delta 2 of the bar 11 at a point between the snout support point $S_1$ and the intermediate support tube point $S_2$. Therefore, it is advantageous to provide a damping unit $C_2$ at a point along the bar 11, inward from the support point $S_1$. With reference also to FIGS. 2 and 3, the second annular damping chamber 40 is formed around the boring bar 11 at an inward position measured axially as $D_2$.

It will be appreciated by those skilled in the art that the compound damper system shown by be formed with visco-elastic damper elements taken alone or in combination with the viscous damper elements shown in the damping chambers 33,40.

While the invention has been shown in connection with a preferred embodiment, it is not intended that the invention be so limited, but rather, the invention extends to all such designs and modifications as come within the scope of the appended claims.

What is claimed is:

1. A compound damper system for an extensible tool bar, comprising:
    a housing;
    a first bearing located in said housing at the outer face thereof;
    a second bearing, axially spaced from said first bearing, and located at the interior of said housing;
    a tool bar, rotatably carried in said bearings at all times, and with said second bearing as a reference point, said tool bar being axially extensible from
        a first effective length, L1, where the outermost, load-bearing end is proximally outside said first bearing, to
        a second effective length L2, where the outermost, load-bearing end is distally outside said first bearing;
    a first radial damper unit in contact with said first bearing; and
    a second radial damper unit in contact with said tool bar at a point approximately midway between said first and second bearings
        whereby radial vibrations of said tool bar at a point proximally outside said first bearing will be attenuated principally by said first damper unit at said first bearing, and
        whereby radial vibration of said tool bar at a point distally outside said first bearing will be attenuated principally by said second damper unit between said first and second bearings.

* * * * *